United States Patent
Kim et al.

(10) Patent No.: US 9,145,327 B2
(45) Date of Patent: Sep. 29, 2015

(54) METHOD FOR FORMING LUBRICANT LAYER ON SURFACE OF GLASS AND METHOD FOR MANUFACTURING GLASS USING THE SAME

(71) Applicant: LG CHEM, LTD., Seoul (KR)

(72) Inventors: Han-Kook Kim, Daejeon (KR); Jung-Sik Bang, Daejeon (KR); Duk-Sik Ha, Daejeon (KR); Kyoung-Hoon Min, Daejeon (KR); Du-Sun Hwang, Seoul (KR)

(73) Assignee: LG CHEM, LTD., Seoul (KR)

( * ) Notice: Subject to any disclaimer, the term of this patent is extended or adjusted under 35 U.S.C. 154(b) by 187 days.

(21) Appl. No.: 13/899,405

(22) Filed: May 21, 2013

(65) Prior Publication Data

US 2013/0260153 A1 Oct. 3, 2013

Related U.S. Application Data

(63) Continuation of application No. PCT/KR2012/001273, filed on Feb. 20, 2012.

(30) Foreign Application Priority Data

Feb. 21, 2011 (KR) .................. 10-2011-0015039
Feb. 20, 2012 (KR) .................. 10-2012-0017126

(51) Int. Cl.
*C03B 40/02* (2006.01)
*C03C 17/22* (2006.01)
*B01J 23/22* (2006.01)

(52) U.S. Cl.
CPC .................. *C03B 40/02* (2013.01); *B01J 23/22* (2013.01); *C03C 17/22* (2013.01); *C03C 2218/35* (2013.01); *Y10T 428/31* (2015.01)

(58) Field of Classification Search
CPC ........ C03B 40/02; C03C 22/18; C03C 17/22; C03C 2218/35
See application file for complete search history.

(56) References Cited

U.S. PATENT DOCUMENTS

| | | |
|---|---|---|
| 3,199,966 A | 8/1965 | O'Connell |
| 3,451,796 A | 6/1969 | Mochel |
| 5,093,196 A | 3/1992 | Hecq et al. |

(Continued)

FOREIGN PATENT DOCUMENTS

| | | |
|---|---|---|
| CN | 101489946 A | 7/2009 |
| EP | 0 325 213 | 7/1989 |
| FR | 2515633 A1 | 5/1983 |
| GB | 2206878 A | 1/1989 |

OTHER PUBLICATIONS

Mamoru Al: "The Oxidation Activity and Acid-base Properties of V2O5-K2SO4 catalysts" Bulletin of the Japan Petroleum Institute, vol. 18, No. 1, 1976, pp. 50-54, XP002734864, DOI; 10.1627/jpi1959.18.50 p. 50, left-hand column, paragraph 1.

*Primary Examiner* — Queenie Dehghan
(74) *Attorney, Agent, or Firm* — Dentons US LLP

(57) ABSTRACT

A method for forming a lubricant layer on the surface of a glass and a method for manufacturing a glass using the same prevents scratches from occurring at the surface of a glass and decreases corrosion of glass manufacturing equipment. The method for manufacturing a glass includes forming a glass, supplying $SO_2$ gas and a $SO_2$ gas oxidation catalyst to the glass under an oxidation environment to form a lubricant layer at the lower surface of the glass, and annealing the glass.

13 Claims, 5 Drawing Sheets

(56) References Cited

U.S. PATENT DOCUMENTS

| | | |
|---|---|---|
| 5,643,349 A | 7/1997 | Piper et al. |
| 5,707,412 A | 1/1998 | Franz et al. |
| 6,941,742 B1 * | 9/2005 | Neufert et al. ............. 60/274 |
| 7,740,827 B2 | 6/2010 | Felthouse et al. |
| 2008/0171835 A1 * | 7/2008 | Sebe et al. ............. 525/344 |

* cited by examiner

| ESCA(wt%) | Comparative Example 3 | | Comparative Example 6 | | Example 3 | |
|---|---|---|---|---|---|---|
| Dept(nm) | Ca | S | Ca | S | Ca | S |
| 0 | 4.2 | 5.2 | 3.2 | 5.3 | 6.7 | 10.5 |
| 1 | 4.2 | 1.9 | 4.2 | 3.5 | 9.1 | 11.0 |
| 2 | 3.6 | 1.2 | 4.1 | 3.2 | 10.3 | 10.3 |
| 4 | 3.1 | 0.3 | 3.9 | 1.8 | 10.7 | 8.7 |
| 6 | 2.7 | 0.0 | 3.9 | 1.1 | 11.8 | 7.4 |
| 8 | 2.5 | 0.0 | 3.5 | 0.8 | 11.8 | 6.8 |
| 10 | 2.5 | 0.0 | 3.5 | 0.4 | 10.9 | 6.3 |
| 15 | 2.3 | 0.0 | 2.9 | 0.0 | 11.5 | 4.5 |
| 20 | 2.3 | 0.0 | 2.6 | 0.0 | 9.4 | 3.4 |
| 25 | 2.2 | 0.0 | 2.2 | 0.0 | 8.0 | 2.3 |
| 30 | 2.4 | 0.0 | 2.5 | 0.0 | 6.6 | 1.2 |
| 35 | 2.3 | 0.0 | 2.5 | 0.0 | 5.5 | 0.4 |
| 40 | 2.3 | 0.0 | 2.6 | 0.0 | 3.6 | 0.0 |
| 45 | 2.4 | 0.0 | 2.4 | 0.0 | 2.8 | 0.0 |
| 50 | 2.2 | 0.0 | 2.5 | 0.0 | 2.7 | 0.0 |

METHOD FOR FORMING LUBRICANT LAYER ON SURFACE OF GLASS AND METHOD FOR MANUFACTURING GLASS USING THE SAME

CROSS-REFERENCE TO RELATED APPLICATION

This application is a Continuation Bypass of International Application No. PCT/KR2012/001273, filed Feb. 20, 2012, and claims priority to and the benefit of Korean Patent Application Nos. 10-2011-0015039, filed Feb. 21, 2011, and 10-2012-0017126, filed Feb. 20, 2012, the disclosures of which are incorporated herein by reference in their entirety.

BACKGROUND OF THE DISCLOSURE

1. Field of the Disclosure

The present disclosure relates to a glass manufacturing technique, and more particularly, to a method for forming a lubricant layer on the surface of a glass and a method for manufacturing a glass using the same, which may prevent scratches from occurring at the surface of a glass and decrease corrosion of glass manufacturing equipment.

2. Description of the Related Art

Many kinds of flat glasses are being used in various fields like window panes, window screens of vehicles and mirrors. Such a flat glass may be manufactured in various ways. Among them, a representative method is a production method using a float method. For example, thin glass planes or glass films for TFT displays are frequently manufactured by the float method. The glass manufactured by the float method is called a float glass.

FIG. 1 is a schematic diagram showing a system for manufacturing a float glass.

As shown in FIG. 1, a float glass is generally formed by using a float bath 10 where a molten metal M such as molten tin or molten tin alloy is stored and flows. At this time, a molten glass having a lower viscosity than the molten metal M and lighter than the molten metal M by about ⅔ is successively supplied into the float bath 10 through an inlet of the float bath 10. The molten glass moves to the downstream of the float bath 10 while floating and spreading on the molten metal M. In this process, the molten glass nearly reaches an equivalent thickness according to its surface tension and gravity to form a glass strip or ribbon which is solidified to some extent.

In addition, the molten glass ribbon formed as above is transferred from the float bath 10 to an annealing furnace 20 and experiences an annealing process. In the annealing process, the glass is transferred from an inlet to an outlet of the annealing furnace 20 by transfer means such as a roller 30 or a belt. In addition, after the annealing process, the glass may also be carried by the transfer means such as the roller 30.

While the glass is transferred in the annealing process or after the annealing process, the lower surface of the glass may come into contact with the transfer means such as the roller 30. At this time, due to the transfer means such as the roller 30, flows, cracks or scratches may occur at the lower surface of the glass. Particularly, if the above equipment is used continuously, impurities or glass fractures may be attached to the transfer means such as the roller 30. In this case, scratches may occur more easily at the lower surface of the glass.

If scratches occur at the lower surface of the glass during a glass transferring process using the roller 30 or the lime, the quality and yield of glass greatly deteriorate. Therefore, efforts are being made to prevent scratches from occurring at the lower surface of a glass during the glass transferring process, particularly in the annealing furnace 20, or during a process of transferring a glass after the annealing process.

Among them, a representative technique is to supply $SO_2$ gas to the lower surface of a glass at an initial stage of the glass annealing process or before the glass annealing process. If the $SO_2$ gas is sprayed to the lower surface of a glass as described above, the $SO_2$ gas reacts with alkali components of the glass, particularly sodium components, to form sulphate such as $Na_2SO_4$. In addition, the formed sulphate serves as a lubricant layer since its film strength is higher than that of a glass, thereby preventing scratches from occurring at the lower surface of the glass by the transfer means such as the roller 30 and improving the scratch resistance of the glass.

However, in case of a non-alkali glass substantially not containing an alkali component such as sodium, like a glass for LCD, even though $SO_2$ gas is supplied, a sulphate lubricant layer is not easily formed by an alkali metal such as $Na_2SO_4$. The $SO_2$ gas should react with components such as alkali earth metal like calcium in the glass to form a sulphate lubricant layer such as $CaSO_4$, but the $SO_2$ gas does not easily react with alkali earth metals or the like in comparison to alkali metals such as sodium. Therefore, in order to form a lubricant layer such as $CaSO_4$, an excessive amount of $SO_2$ gas should be used. However, if a lot of $SO_2$ gas is used, the production cost may increase accordingly. In addition, the toxicity of the $SO_2$ gas may act as a source of environmental pollution and cause serious harm to workers health.

Moreover, since manufacturing equipment or instruments such as the annealing furnace 20 may be easily corroded due to $SO_2$ gas, the productivity and process efficiency when manufacturing glasses may be adversely affected. For this reason, the $SO_2$ gas should be used as little as possible. However, in the conventional technique, an excessive amount of $SO_2$ gas should be inevitably used to form a lubricant layer for preventing scratches from occurring at the lower surface of a glass.

SUMMARY OF THE DISCLOSURE

Technical Problem

The present disclosure is designed to solve the problems of the prior art, and therefore it is an object of the present disclosure to provide an apparatus for forming a lubricant layer on the surface of a glass, which may use a small amount of $SO_2$ gas and effectively prevent scratches from occurring at the surface of the glass; and a method for manufacturing a glass using the same.

Other objects and advantages of the present disclosure will be understood by the following description and become more apparent from the embodiments of the present disclosure, which are set forth herein. It will also be apparent that objects and advantages of the present disclosure can be embodied easily by the means defined in claims and combinations thereof.

Technical Solution

In order to accomplish the above object, the present disclosure provides a method for manufacturing a glass, which includes forming a glass; supplying $SO_2$ gas and a $SO_2$ gas oxidation catalyst to the glass under an oxidation environment to form a lubricant layer at the lower surface of the glass; and annealing the glass.

Preferably, the $SO_2$ gas is oxidized into $SO_3$ gas under the oxidation environment.

Also preferably, the $SO_2$ gas oxidation catalyst includes $V_2O_5$.

Also preferably, the lubricant layer formed in the lubricant layer forming process includes $CaSO_4$.

In addition, in order to accomplish the above object, the present disclosure provides a glass, which is manufactured by the above method for manufacturing a glass.

In addition, in order to accomplish the above object, the present disclosure provides a method for forming a lubricant layer on the surface of a glass by using $SO_2$ gas, wherein the $SO_2$ gas is supplied to the glass together with a $SO_2$ gas oxidation catalyst under an oxidation environment.

Preferably, the $SO_2$ gas is oxidized into $SO_3$ gas under the oxidation environment.

Also preferably, the $SO_2$ gas oxidation catalyst includes $V_2O_5$.

Also preferably, the lubricant layer includes $CaSO_4$.

In addition, in order to accomplish the above object, the present disclosure provides an apparatus for manufacturing a glass, which includes: a glass forming unit for forming a glass; a $SO_2$ supply unit for supplying $SO_2$ gas to the formed glass; an $O_2$ supply unit for supplying $O_2$ gas to the formed glass; and a catalyst supply unit for supplying a $SO_2$ gas oxidation catalyst with respect to the $SO_2$ gas supplied to the glass.

Advantageous Effects

According to the present disclosure, since a lubricant layer is easily formed at the surface of a glass, particularly the lower surface of the glass which directly contacts a roller or the like, the scratch resistance of the glass may be improved. Therefore, when the glass is transferred by the transfer means such as a roller and a belt during a manufacturing process such as a glass annealing process, it is possible to effectively prevent flaws, cracks or scratches from occurring at the lower surface of the glass. Therefore, a defect rate may be lowered during the glass manufacturing process and a high-quality glass may be obtained. In addition, since scratches at the glass decrease, time and costs required for polishing the glass may be reduced.

Further, according to the present disclosure, a sulphate lubricant layer may be sufficiently formed at the surface of a glass by using a small amount of $SO_2$ gas. Therefore, it is possible to suppress $SO_2$ gas with strong toxicity causing environmental pollution and bringing harmful working conditions to a worker. In addition, the $SO_2$ gas may be more simply purchased and treated at low costs. Moreover, it is possible to suppress that glass manufacturing equipment or instruments such as an annealing furnace from being corroded by the $SO_2$ gas, which may extend the life span of the glass manufacturing equipment or instruments.

Particularly, in case of a non-alkali glass substantially not containing an alkali metal such as sodium, like a glass for LCD, a sulphate lubricant layer may be sufficiently formed by using a relatively small amount of $SO_2$ gas.

In addition, since the time required for forming the sulphate lubricant layer is shortened, the time required for the entire glass manufacturing process may be shortened and the production cost may be reduced.

BRIEF DESCRIPTION OF THE DRAWINGS

Other objects and aspects of the present disclosure will become apparent from the following descriptions of the embodiments with reference to the accompanying drawings in which.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 2:
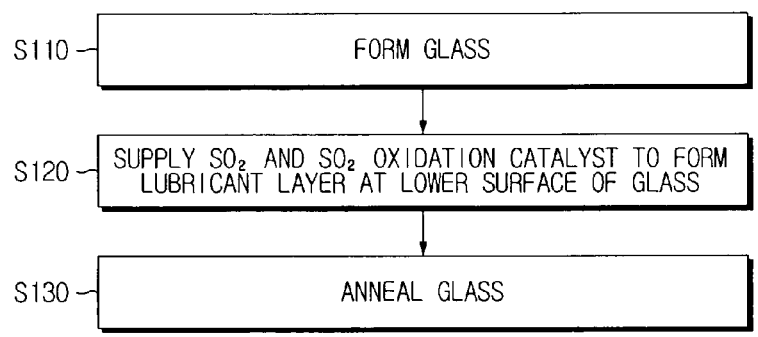
FIG. 2 is a flowchart for schematically illustrating a method for manufacturing a glass according to an embodiment of the present disclosure.

FIG. 2 is a flowchart for schematically illustrating a method for manufacturing a glass according to an embodiment of the present disclosure.

Referring to FIG. 2, a glass is firstly formed by using a molten glass to make a glass according to the present disclosure (S110). The glass forming process S110 may be performed in various ways, and the present disclosure is not limited to a specific glass forming manner.

Figure 1:
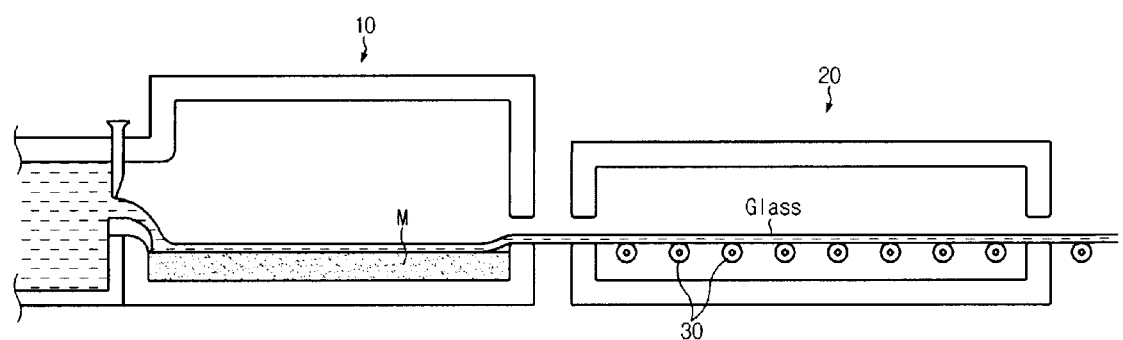
FIG. 1 is a schematic diagram showing a system for manufacturing a float glass.

Preferably, the glass forming process S110 may be performed by means of a float method. In other words, as shown in FIG. 1, a molten glass is supplied to a float bath 10 storing a molten metal M and floated and spread on the metal M to form a glass. At this time, the thickness of a glass ribbon may be changed by adjusting the amount of glass put through an inlet of the float bath 10 or by controlling forming means such as top rollers 30 installed in the float bath 10. The glass forming process using such a float method is well known in the art and is not described in detail here. The float glass manufacturing method includes cyclic successive processes and may operate constantly without a cessation, which allows flat glasses to be manufactured for several years without a pause. This is very suitable for glass forming. In addition, various glass forming methods well known in the art at the filing of the present disclosure may be adopted in the glass forming process S110 of the present disclosure.

If a glass is formed from a molten glass as described above, the glass is annealed (S130). The method for manufacturing a glass according to the present disclosure performs forming a lubricant layer at the lower surface of the glass (S120) before performing the glass annealing process S130. Here, 'before performing the glass annealing process S130' means the moment before the glass annealing process S130 is entirely completed, which includes the moment before the glass annealing process S130 is initiated as well as the moment the glass annealing process S130 is proceeding but not yet completed. For example, the lubricant layer forming process S120 may be performed at an early stage of the glass annealing process S130. In the lubricant layer forming process S120, the method for manufacturing a glass according to the present disclosure supplies $SO_2$ gas and $SO_2$ gas oxidation catalyst to the glass under an oxidation environment in order to form a lubricant layer at the lower surface of the glass.

The $SO_2$ gas reacts with some components of the glass to generate sulphate so that a lubricant layer may be formed at the lower surface of the glass by the sulphate. Particularly, in case of a non-alkali glass, the $SO_2$ gas supplied in the lubricant layer forming process S120 may react with a component such as calcium contained in the glass to form a sulphate lubricant layer.

$$SO_2(g) + \tfrac{1}{2} \times O_2(g) \rightarrow SO_3(g) \qquad \text{Formula 1}$$

$$SO_3(g) + CaO(s) \rightarrow CaSO_4(s) \qquad \text{Formula 2}$$

In other words, the $SO_2$ gas, supplied under an oxidation environment where oxygen is present, reacts with oxygen and is oxidized into $SO_3$ gas, as shown in Formula 1. In addition, the $SO_3$ gas generated as above reacts with calcium oxide contained in the glass to form $CaSO_4$ so that a lubricant layer is formed at the surface of the glass.

Even though Formula 2 shows only the process where $SO_2$ gas reacts with CaO in the glass to form a $CaSO_4$ lubricant layer, the $SO_2$ gas may also react with another component of the glass to form a lubricant layer by another kind of sulphate. For example, the $SO_2$ gas may react with MgO or $Cr_2O_3$ of the glass to form a sulphate lubricant layer such as $MgSO_4$ and $Cr_2(SO_4)_3$. Since the $SO_2$ gas supplied to the glass as described above reacts with a certain component of the glass and forms a lubricant layer at the surface by sulphate, it is possible to prevent flaws, cracks or scratches from occurring at the surface of the glass.

Particularly, the method for manufacturing a glass according to the present disclosure supplies the $SO_2$ gas oxidation catalyst together with the $SO_2$ gas. Here, the $SO_2$ gas oxidation catalyst represents a catalyst which may promote a chemical reaction of Formula 1 where $SO_2$ gas is oxidized into $SO_3$ gas.

Preferably, the $SO_2$ gas oxidation catalyst may include $V_2O_5$. In a case where $V_2O_5$, namely vanadium pentoxide, is added together with $SO_2$ gas, the oxidation reaction of the $SO_2$ gas into $SO_3$ gas is promoted. In addition, as $SO_2$ gas is oxidized into $SO_3$ gas more and more, the reaction for forming $CaSO_4$ by the $SO_3$ gas as in Formula 2 may be actively performed. Therefore, the lubricant layer of $CaSO_4$ may be sufficiently formed by using just a small amount of $SO_2$ gas. Since $V_2O_5$ has good resistance against catalyst inactivation of $SO_2$ gas catalyst, $V_2O_5$ is preferred as a $SO_2$ gas oxidation catalyst in the present disclosure.

When $V_2O_5$ is supplied as a $SO_2$ gas oxidation catalyst together with $SO_2$ gas, $V_2O_5$ may be supplied in various states and forms. For example, $V_2O_5$ may be supplied in the form of powder. In a case where $V_2O_5$ is supplied in the form of powder, the reaction area increases and the oxidation reaction of the $SO_2$ gas in Formula 1 may be performed more actively. However, the present disclosure is not limited to a specific form or state of $V_2O_5$. For example, $V_2O_5$ may be heated over a melting point and then sprayed.

In addition, various catalysts may be used as the $SO_2$ gas oxidation catalyst in addition to $V_2O_5$. For example, $Fe_2O_3$, CuO, $TiO_2$, $Cr_2O_3$, $SiO_2$, CaO, $Al_2O_3$ or $WO_3$ may be used as the $SO_2$ gas oxidation catalyst, and at least two of them may be combined and used. As described above, the $SO_2$ gas oxidation catalyst is not limited to a specific kind of material if it can promote oxidation of $SO_2$ gas into $SO_3$ gas. In addition, the $SO_2$ gas oxidation catalyst may be used together with another material which enhances activation of the catalyst. For example, $V_2O_5$ may be used together with $K_2O$, $K_2SO_4$, $K_2S_2O_7$ or the like, which enhances the catalyst activation of $V_2O_5$.

As described above, according to the present disclosure, since the $SO_2$ gas oxidation catalyst is supplied together with the $SO_2$ gas, the $SO_2$ gas is actively oxidized and so a lubricant layer is sufficiently formed by sulphate. Particularly, in case of a non-alkali glass substantially not containing alkali ions such as sodium, a lubricant layer is not easily formed in comparison to an alkali glass. However, according to the present disclosure, since the $SO_2$ gas oxidation catalyst may promote the oxidation reaction of the $SO_2$ gas as in Formula 1, in a non-alkali glass, a lubricant layer may be rapidly and sufficiently formed by means of sulphate by using a small amount of $SO_2$ gas.

However, even though the above embodiments have been illustrated based on the case where the present disclosure is applied to a non-alkali glass, it does not mean that the present disclosure must be applied to a non-alkali glass. In other words, the present disclosure may also be applied to an alkali glass, and in case of an alkali glass, the formation of alkali metal sulphate such as $Na_2SO_4$ may be further promoted. Therefore, in this case, a lubricant layer may also be sufficiently formed by using a small amount of $SO_2$ gas.

Meanwhile, in the lubricant layer forming process S120, the $SO_2$ gas and the $SO_2$ gas oxidation catalyst are preferably supplied in the range of ±100° C. from a transition temperature of the glass. The reaction between $SO_2$ gas and a glass is actively performed within 100° C. below or above the transition temperature of the glass. For example, since a glass for LCD has a transition temperature of about 750° C., the $SO_2$ gas and the $SO_2$ gas oxidation catalyst may be supplied under a temperature environment of about 650 to 850° C.

In addition, under the oxidation environment where $SO_2$ gas may be oxidized, moisture or air may be further supplied together with oxygen. In other words, the oxygen used for oxidizing $SO_2$ gas may be supplied in various ways so that the oxidation of $SO_2$ gas may be activated.

The glass annealing process S130 may be performed by using an annealing furnace 20, and the $SO_2$ gas and the $SO_2$ gas oxidation catalyst may be supplied in the annealing furnace 20.

Figure 3:
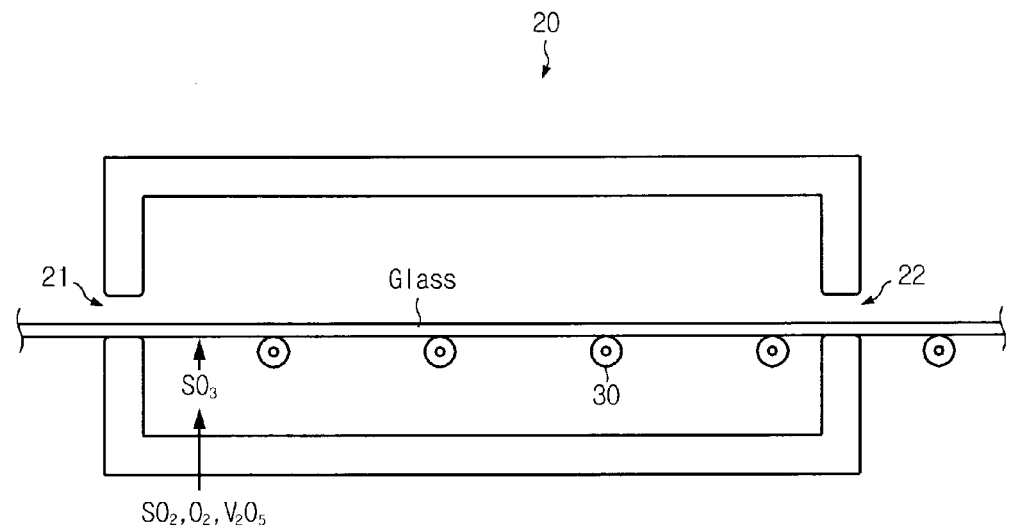
FIG. 3 is a schematic diagram showing an example where $SO_2$ gas and $SO_2$ gas oxidation catalyst are supplied to a glass in an annealing furnace in order to form a lubricant layer at the lower surface of the glass according to an embodiment of the present disclosure.

FIG. 3 is a schematic diagram showing an example where $SO_2$ gas and $SO_2$ gas oxidation catalyst are supplied to a glass in the annealing furnace 20 in order to form a lubricant layer at the lower surface of the glass according to an embodiment of the present disclosure.

Referring to FIG. 3, the glass formed in the forming process is introduced though an inlet 21 of the annealing furnace.

At this time, the temperature of the inlet 21 of the annealing furnace may be about 700 to 800° C. In addition, the glass introduced into the annealing furnace 20 as described above is annealed while being transferred toward an outlet 22 of the annealing furnace of about 200 to 300° C. by at least one roller 30 provided at the annealing furnace 20.

Particularly, according to the embodiment of FIG. 3, $V_2O_5$ serving as the $SO_2$ gas oxidation catalyst is supplied at the inlet 21 of the annealing furnace together with $SO_2$ gas and $O_2$ gas. Therefore, $V_2O_5$ promotes the oxidation reaction of $SO_2$ gas into $SO_3$ gas, and the $SO_3$ gas may promote the formation of sulphate at the lower surface of the glass. Therefore, according to this embodiment, since the lubricant layer is sufficiently formed at the lower surface of the glass by sulphate, even though the lower surface of the glass comes into contact with the roller 30 located in the annealing furnace 20 or the roller 30 provided after the annealing furnace 20, the sufficiently formed lubricant layer may suppress the formation of scratches at the lower surface of the glass.

Meanwhile, even though the embodiment of FIG. 3 has been illustrated as the $SO_2$ gas and the $SO_2$ gas oxidation catalyst are supplied near the inlet 21 of the annealing furnace, namely at an early stage of the annealing process, it is just an example, and the $SO_2$ gas and the $SO_2$ gas oxidation catalyst may be supplied in various forms and ways. For example, the $SO_2$ gas and the $SO_2$ gas oxidation catalyst may be supplied before the glass is introduced to a middle portion of the annealing furnace 20 or to the inside of the annealing furnace 20.

In addition, even though the embodiment of FIG. 3 has been illustrated as $O_2$ gas is directly supplied to form an oxidation environment of the $SO_2$ gas, it is also possible to supply air containing $O_2$ gas.

The glass according to the present disclosure is a glass prepared according to the above glass manufacturing method.

Meanwhile, even though the above embodiment illustrates a lubricant layer forming at the lower surface of a glass in order to prevent scratches from occurring at the lower surface while the glass is being transferred by transfer means such as the roller 30 during or after the glass annealing process, the lubricant layer may also be formed at various processes of the glass manufacturing method other than the glass annealing process. In other words, if cracks or scratches may occur at the surface of a glass, $SO_2$ gas and $SO_2$ gas oxidation catalyst may be supplied at any process, without being limited to the time before or after the glass annealing process, to promote the formation of a sulphate lubricant layer at the surface of the glass.

Hereinafter, the present disclosure will be described in more detail based on examples and comparative examples. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

First, the examples and the comparative examples will be compared to look into the effect of promoting the formation of a sulphate lubricant layer at the surface of a glass and preventing scratches from occurring, in a case where a $SO_2$ gas oxidation catalyst is supplied together with $SO_2$ gas to form a lubricant layer on at least one surface of the glass as in the present disclosure.

Examples 1 to 3

Figure 4:
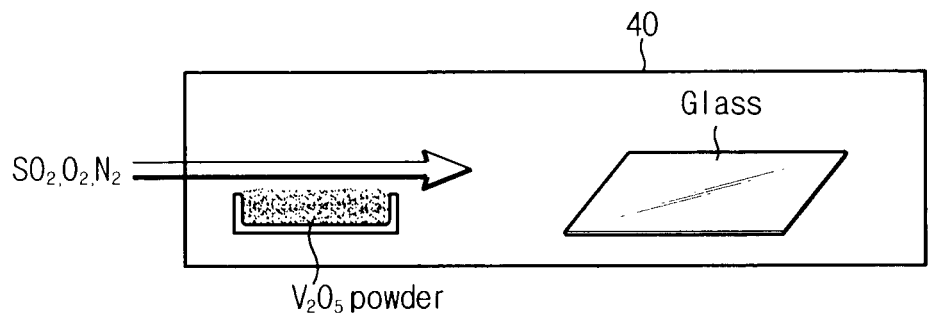
FIG. 4 is a schematic diagram showing a configuration for causing an oxidation reaction of $SO_2$ gas at the surface of a glass plate by supplying $SO_2$ gas and $SO_2$ gas oxidation catalyst together to the glass plate according to an embodiment of the present disclosure.

FIG. 4 is a schematic diagram showing a device for supplying $SO_2$ gas and an $SO_2$ gas oxidation catalyst to a glass plate to cause an oxidation reaction of the $SO_2$ gas at the surface of the glass plate according to an embodiment of the present disclosure.

As Examples 1 to 3 according to the present disclosure, as shown in FIG. 4, a glass plate for LCD with a size of 15×15 mm was prepared and sealed with an O-ring. After that, the glass plate was put into a quartz tube furnace 40 of 650° C. (Example 1), 700° C. (Example 2) and 750° C. (Example 3), and $SO_2$ gas and $O_2$ gas were supplied thereto to make an environment of $SO_2$ 5%, $O_2$ 10%. In addition, $V_2O_5$ powder was placed on the supply path of the $SO_2$ gas and the $O_2$ gas so that the $V_2O_5$ powder was supplied to the glass plate as a $SO_2$ gas oxidation catalyst. In addition, this state was maintained for 60 minutes so that the reactions of Formulas 1 and 2 occur in the tube furnace 40.

And then, the tube furnace 40 of each example was sufficiently cooled and all reaction gases were exhausted out of the tube furnace 40 by using nitrogen gas.

After that, the IC (Ion Chromatography) analysis was performed to the glass plates of Examples 1 to 3, respectively, and the number of scratches was measured by using the Taber manner. The analysis results are shown in Table 1 below.

Here, the IC analysis is an analysis method for comparing the degree of $CaSO_4$ formed at the surface of the glass plate as a lubricant layer. For the IC analysis, each glass plate was put into 10 mg DI water and maintained at 60° C. for 10 minutes so that $CaSO_4$ at the surface of the glass plate is dissolved in the DI water, and the IC analysis was performed to the solution. At this time, the dissolution of $CaSO_4$ was checked by performing an ESCA analysis before or after the IC analysis.

In addition, the measurement of the number of scratches using the Taber manner is an analysis method for checking scratch resistance at the surface of the glass plate. The number of scratches of each glass plate was measured according to the method shown in FIG. 5.

Figure 5:
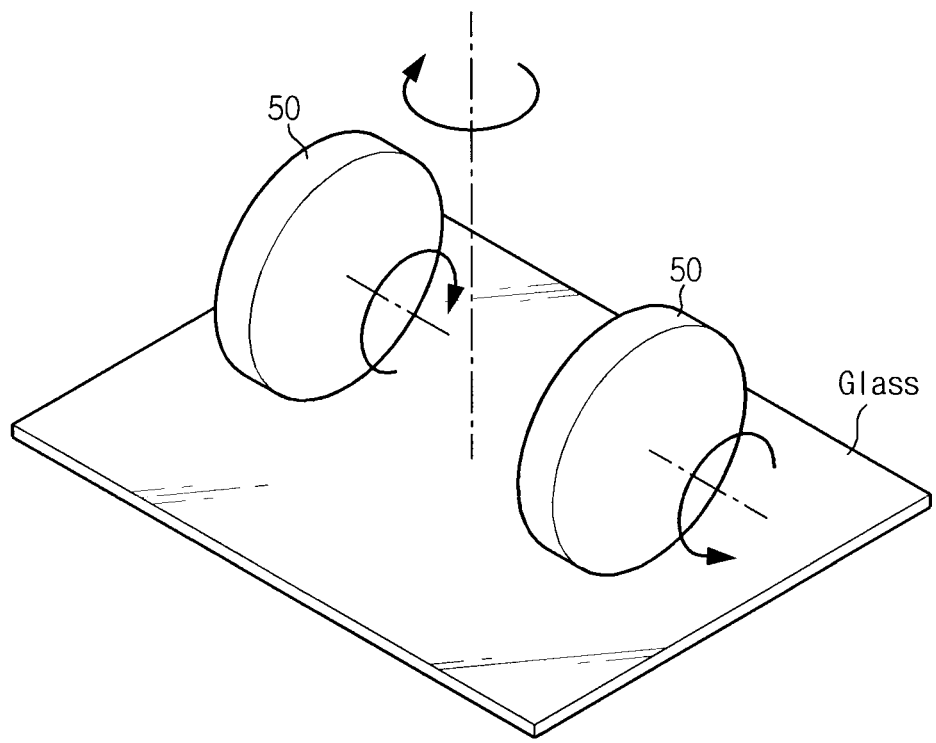
FIG. 5 is a schematic diagram showing a configuration for measuring the scratch resistance of a glass plate in a Taber manner.

FIG. 5 is a schematic diagram showing a configuration for measuring the scratch resistance of a glass plate in a Taber manner.

As shown in FIG. 5, the glass plates of Examples 1 to 3 were placed on a plate and rotated. At this time, two abrading wheels 50 rotate in opposite directions at the upper portion of the glass plate to cause scratches at the glass plate. Here, the abrading wheel 50 employs a 500 g wheel and the number of rotation was set to 10. After that, each glass plate was washed, and then the number of scratches occurring within internal 12×12 mm of each glass plate was measured by using an optical microscope.

Comparative Examples 1 to 6

As Comparative Examples 1 to 3 to be compared with Examples 1 to 3, a glass plate for LCD with a size of 15×15 mm was sealed with an O-ring and then put into a tube furnace 40 of 650° C. (Comparative Example 1), 700° C. (Comparative Example 2) and 750° C. (Comparative Example 3), and $SO_2$ gas and $O_2$ gas were supplied thereto to make an environment of $SO_2$ 5%, $O_2$ 10%, similar to Examples 1 to 3. However, $V_2O_5$ powder was not supplied, different from Examples 1 to 3. In addition, this state was maintained for 60 minutes so that the reactions of Formulas 1 and 2 occur. After the glass plates of Comparative Examples 1 to 3 were reacted in the tube furnace 40 of each condition, the tube furnace 40 was cooled and all reaction gases were exhausted out of the tube furnace 40 by using nitrogen gas.

In addition, as Comparative Examples 4 to 6 to be compared with Examples 1 to 3, a glass plate for LCD with a size of 15×15 mm was sealed with an O-ring and then put into a tube furnace 40 of 650° C. (Comparative Example 4), 700° C. (Comparative Example 5) and 750° C. (Comparative Example 6), and $SO_2$ gas and $O_2$ gas were supplied thereto to make an environment of $SO_2$ 5%, $O_2$ 10%, similar to Examples 1 to 3. However, $V_2O_5$ powder was not supplied, different from Examples 1 to 3, and moisture ($H_2O$) was supplied to the glass plate by using a bubbler. In addition, this state was maintained for the glass plate to react for 60 minutes. After the glass plates of Comparative Examples 4 to 6 were reacted for 60 minutes in the tube furnace 40 of each condition, the tube furnace 40 was cooled and all reaction gases were exhausted out of the tube furnace 40 by using nitrogen gas.

After that, the IC analysis was performed to the glass plates of Comparative Examples 1 to 6, similar to Examples 1 to 3, and the number of scratches was measured in the Taber manner. The analysis and measurement results are shown in Table 1 below.

as a $SO_2$ gas oxidation catalyst is supplied together with $SO_2$ gas, $CaSO_4$ serving as a lubricant layer may be more sufficiently formed at the surface of the glass plate, and so the scratch resistance at the surface of the glass plate may be remarkably improved. Therefore, the present disclosure may effectively reduce the formation of scratches at the surface of the glass plate.

Hereinafter, the improvement of the effect obtained by the formation of a $CaSO_4$ layer according to the present disclosure will be examined in another way. In other words, with respect to the glass plate of Example 3 in Table 1 and the glass plates of Comparative Examples 3 and 6, the amount and thickness of a $CaSO_4$ layer formed at the surface of each glass plate will be measured and compared.

Here, the amount of the $CaSO_4$ layer formed at the surface of each glass plate is obtained by measuring weight % of Ca and S by means of ESCA (EQC-0124). In addition, the thickness of the $CaSO_4$ layer formed at the surface of each glass

TABLE 1

| | $SO_2$ (%) | $O_2$ (%) | Reaction time (min) | Temp. (° C.) | $H_2O$ | $V_2O_5$ | IC analysis (ppm) | Number of scratches |
|---|---|---|---|---|---|---|---|---|
| Example 1 | 5 | 10 | 60 | 650 | X | Used | 2.8 | 119 |
| Example 2 | | | | 700 | X | Used | 5.2 | 80 |
| Example 3 | | | | 750 | X | Used | 8.7 | 80 |
| Comparative Example 1 | | | | 650 | X | X | 0.3 | 148 |
| Comparative Example 2 | | | | 700 | X | X | 0.6 | 130 |
| Comparative Example 3 | | | | 750 | X | X | 1.1 | 138 |
| Comparative Example 4 | | | | 650 | Used | X | 0.9 | 134 |
| Comparative Example 5 | | | | 700 | Used | X | 1.4 | 139 |
| Comparative Example 6 | | | | 750 | Used | X | 2.4 | 110 |

If the IC analysis results are considered in Table 1, in case of Examples 1 to 3 using $V_2O_5$ as a $SO_2$ gas oxidation catalyst, the IC analysis was measured as 2.8 to 8.7 ppm (5.6 ppm on average). However, in Comparative Examples 1 to 3 not using both $H_2O$ and $V_2O_5$, the IC analysis was measured as 0.3 to 1.1 ppm (0.7 ppm on average), and in Comparative Examples 4 to 6 using $H_2O$ and not using $V_2O_5$, the IC analysis was measured as 0.9 to 2.4 ppm (1.6 ppm on average). From these results, it could be understood that $CaSO_4$ serving as a lubricant layer is formed much more on the surface of the glass plate in the case where $V_2O_5$ serving as an oxidation catalyst is used together with $SO_2$ gas.

In addition, if the measurement results about the number of scratches are considered in Table 1, in case of Examples 1 to 3, the number of scratches occurring at the surface of a glass was 93 on average. However, in Comparative Examples 1 to 3, the number of scratches was 138.7 on average, and in Comparative Examples 4 to 6, the number of scratches was 127.7 on average. Therefore, it could be understood that much more scratches occur at the surface of the glass plates according to the comparative examples. Particularly, in case of Comparative Examples 4 to 6 using $H_2O$ instead of $V_2O_5$, even though the number of scratches is somewhat smaller than that of Comparative Examples 1 to 3 not using both $V_2O_5$ and $H_2O$, but its effect is not so great in comparison to Examples 1 to 3.

When looking at the IC analysis results and the measurement results of the number of scratches using the Taber manner, it could be understood that, in a case where $V_2O_5$ serving plate may be determined by etching the surface of the glass plate by means of Ar ion beam and judging the presence of S up to the depth of 50 nm. In addition, the measurement results are shown in FIGS. 6 and 7.

Figures 6, 7:
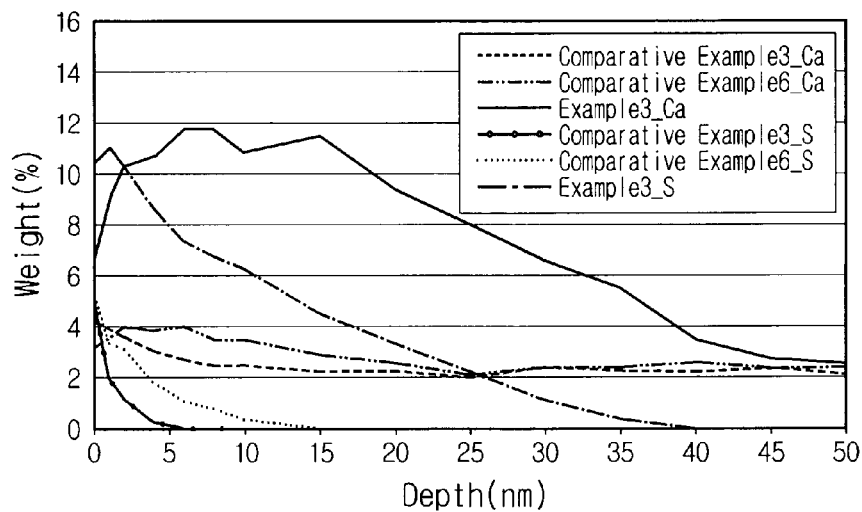
FIG. 6 is a graph showing measurement results of Ca and S contents at each depth of the glass plate according to an example of the present disclosure and a comparative example.
FIG. 7 is a table which expresses the graph of FIG. 6 with numerals.

FIG. 6 is a graph showing measurement results of Ca and S contents at each depth of the glass plate according to an example of the present disclosure and a comparative example, and FIG. 7 is a table which expresses the graph of FIG. 6 with numerals.

Referring to FIGS. 6 and 7, in case of the glass plate of Example 3 according to the present disclosure, the S concentration at the surface reached about 10 wt %, but in case of the glass plates of Comparative Examples 3 and 6, the S concentration at the surface was just about 5 wt %. In addition, regarding the Ca concentration, in case of the glass plate of Example 3, the surface concentration reached about 7 wt %, but in case of the glass plates of Comparative Examples 3 and 6, the surface concentration was just about 3-4 wt %.

Particularly, considering that, in case of Example 3, S was found up to the depth of about 40 nm from the surface of the glass plate, the $CaSO_4$ layer may be estimated as having a thickness of about 40 nm. However, in case of Comparative Example 3, S was found up to the depth of about 5 nm from the surface of the glass plate, and thus the $CaSO_4$ layer may be estimated as having a thickness of about 5 nm. In addition, in case of Comparative Example 6, S was found up to the depth of about 10 nm, and thus the $CaSO_4$ layer may be estimated as having a thickness of about 10 nm. Therefore, it could be understood that the $CaSO_4$ layer formed at the glass plate of Example 3 according to the present disclosure is much thicker than that of the glass plate of Comparative Examples 3 and 6.

Moreover, considering the depth up to about 5 nm from the surface of the glass plate, in case of the glass plate of Example 3, the S concentration was about 10 wt %, but in case of the glass plates of Comparative Examples 3 and 6, the S concentration was just about 3 wt %.

From the results, it could be understood that the $CaSO_4$ layer formed at the surface of the glass plate according to the present disclosure is much thicker and richer.

Meanwhile, the method for manufacturing a glass as described above may be performed by an apparatus for manufacturing a glass according to the present disclosure.

Figure 8:
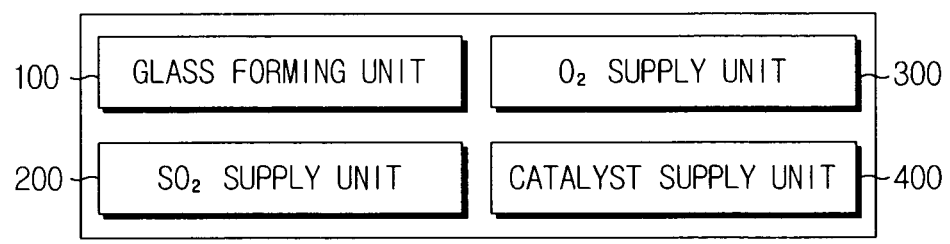
FIG. 8 is a block diagram schematically showing a functional configuration of an apparatus for manufacturing a glass according to an embodiment of the present disclosure.

FIG. 8 is a block diagram schematically showing a functional configuration of the apparatus for manufacturing a glass according to an embodiment of the present disclosure.

Referring to FIG. 8, the apparatus for manufacturing a glass according to the present disclosure includes a glass forming unit 100, a $SO_2$ supply unit 200, an $O_2$ supply unit 300 and a catalyst supply unit 400.

The glass forming unit 100 forms a glass. In case of a float glass, the glass forming unit 100 may be configured to include a float bath.

The $SO_2$ supply unit 200 supplies $SO_2$ gas to the surface of a glass formed by the glass forming unit 100 such as a float bath. Preferably, in a case where a formed glass is introduced into an annealing furnace, the $SO_2$ supply unit 200 supplies $SO_2$ gas into the annealing furnace, so that the $SO_2$ gas is supplied to the surface of the glass.

The $O_2$ supply unit 300 supplies $O_2$ gas to the glass formed by a float bath or the like, so that an oxidation environment is formed around the glass. Therefore, the $SO_2$ gas supplied by the $SO_2$ supply unit 200 may be oxidized into $SO_3$ gas due to the oxidation environment.

Here, the $O_2$ supply unit 300 may supply pure $O_2$ gas and may also supply another gas together with the $O_2$ gas. For example, the $O_2$ supply unit 300 may supply air to form an oxidation environment around the glass.

The catalyst supply unit 400 supplies a $SO_2$ gas oxidation catalyst with respect to the $SO_2$ gas supplied to the glass. In other words, when the $SO_2$ gas is supplied to the glass by the $SO_2$ supply unit 200, the catalyst supply unit 400 provides an oxidation catalyst for the $SO_2$ gas so that the $SO_2$ gas may be easily oxidized into $SO_3$ gas.

Preferably, the catalyst supply unit 400 may supply at least one of $V_2O_5$, $Fe_2O_3$, CuO, $TiO_2$, $Cr_2O_3$, $SiO_2$, CaO, $Al_2O_3$ and $WO_3$ as the $SO_2$ gas oxidation catalyst.

At this time, the catalyst supply unit 400 may further supply at least one of $K_2O$, $K_2SO_4$ and $K_2S_2O_7$ together with the $SO_2$ gas oxidation catalyst.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A method for manufacturing a non-alkali glass, comprising:
   forming a non-alkali glass;
   supplying $SO_2$ gas and a $SO_2$ gas oxidation catalyst to the non-alkali glass under an oxidation environment to form a $CaSO_4$ lubricant layer at the lower surface of the non-alkali glass; and
   annealing the non-alkali glass.

2. The method for manufacturing a non-alkali glass according to claim 1, wherein the $SO_2$ gas is oxidized into $SO_3$ gas under the oxidation environment.

3. The method for manufacturing a non-alkali glass according to claim 1, wherein the $SO_2$ gas oxidation catalyst includes at least one of $V_2O_5$, $Fe_2O_3$, CuO, $TiO_2$, $Cr_2O_3$, $SiO_2$, CaO, $Al_2O_3$ and $WO_3$.

4. The method for manufacturing a non-alkali glass according to claim 3, wherein the lubricant layer forming process further supplies at least one of $K_2O$, $K_2SO_4$ and $K_2S_2O_7$.

5. The method for manufacturing a non-alkali glass according to claim 1, wherein the annealing process is performed by using an annealing furnace, and the $SO_2$ gas and the $SO_2$ gas oxidation catalyst are supplied in the annealing furnace.

6. The method for manufacturing a non-alkali glass according to claim 1, wherein the lubricant layer forming process is performed in the range of ±100° C. from a transition temperature of the non-alkali glass.

7. A method for forming a lubricant layer on the surface of a non-alkali glass by using $SO_2$ gas, wherein the $SO_2$ gas is supplied to the non-alkali glass together with a $SO_2$ gas oxidation catalyst under an oxidation environment.

8. The method for forming a lubricant layer on the surface of a non-alkali glass according to claim 7, wherein the $SO_2$ gas is oxidized into $SO_3$ gas under the oxidation environment.

9. The method for forming a lubricant layer on the surface of a non-alkali glass according to claim 7, wherein the $SO_2$ gas oxidation catalyst includes at least one of $V_2O_5$, $Fe_2O_3$, CuO, $TiO_2$, $Cr_2O_3$, $SiO_2$, CaO, $Al_2O_3$ and $WO_3$.

10. The method for forming a lubricant layer on the surface of a non-alkali glass according to claim 9, wherein at least one of $K_2O$, $K_2SO_4$ and $K_2S_2O_7$ is further supplied.

11. The method for forming a lubricant layer on the surface of a non-alkali glass according to claim 7, wherein the $SO_2$ gas and the $SO_2$ gas oxidation catalyst are supplied in the range of ±100° C. from a transition temperature of the non-alkali glass.

12. The method for manufacturing a non-alkali glass according to claim 1, wherein the lubricant layer is formed at the lower surface of the non-alkali glass to prevent scratches from occurring while the glass is being transferred to an annealing furnace.

13. The method for manufacturing a non-alkali glass according to claim 7, wherein the surface is a lower surface, and wherein the lubricant layer is formed at the lower surface of the non-alkali glass to prevent scratches from occurring while the non-alkali glass is being transferred to an annealing furnace.

* * * * *